United States Patent
Strube et al.

[11] 3,762,368
[45] Oct. 2, 1973

[54] SOLDER BATH FOR FLUX-FREE TINNING

[75] Inventors: Wolf-Dietrich Strube, Munich; Michael Fleischer, Soecking, both of Germany

[73] Assignee: Siemens Aktiengesellschaft, Berlin & Munich, Germany

[22] Filed: Apr. 1, 1971

[21] Appl. No.: 130,344

[30] Foreign Application Priority Data
Apr. 14, 1970 Germany.................. P 20 17 862.5

[52] U.S. Cl. .................................. 118/429, 259/72
[51] Int. Cl. ............................................. B05c 3/05
[58] Field of Search ................................. 118/429; 259/DIG. 43, DIG. 44, 72; 134/1, 184 X

[56] References Cited
UNITED STATES PATENTS

| | | | |
|---|---|---|---|
| 3,385,262 | 5/1968 | Jacke et al. | 118/429 |
| 3,084,650 | 4/1963 | Johns | 118/429 |
| 2,895,845 | 7/1959 | Jones et al. | 118/429 |
| 2,616,820 | 11/1952 | Bourgeaux | 134/184 |
| 3,618,566 | 11/1971 | Walker | 118/429 |
| 3,251,576 | 5/1966 | Horsley | 259/4 |
| R25,033 | 8/1961 | Balamuth et al. | 228/1 |
| 2,824,543 | 2/1958 | Brown | 118/429 |

Primary Examiner—Mervin Stein
Assistant Examiner—Leo Millstein
Attorney—Hill, Sherman, Meroni, Gross & Simpson

[57] ABSTRACT

A device for containing a heated bath of solder for coating or tinning an object without the use of flux by subjecting the bath and object to ultrasonic waves during the tinning process characterized by a probe or sonotrode of the ultrasonic transducer entering the bath through an aperture in the bottom wall of the container so that ultrasonic waves permeate the bath without wave interference due to reflecting from the walls of the container. The probe is sealed to the bottom wall by a device which includes a compressed ring-shaped seal member positioned to engage the probe at a nodal plane. Preferably the probe and transducer are interconnected by an intermediate member which is cooled either by fluids flowing through channels therein, or by a stream of air from a fan which stream is directed at the member so that the transducer does not become damaged by the heat conducted by the probe from the solder bath.

5 Claims, 1 Drawing Figure

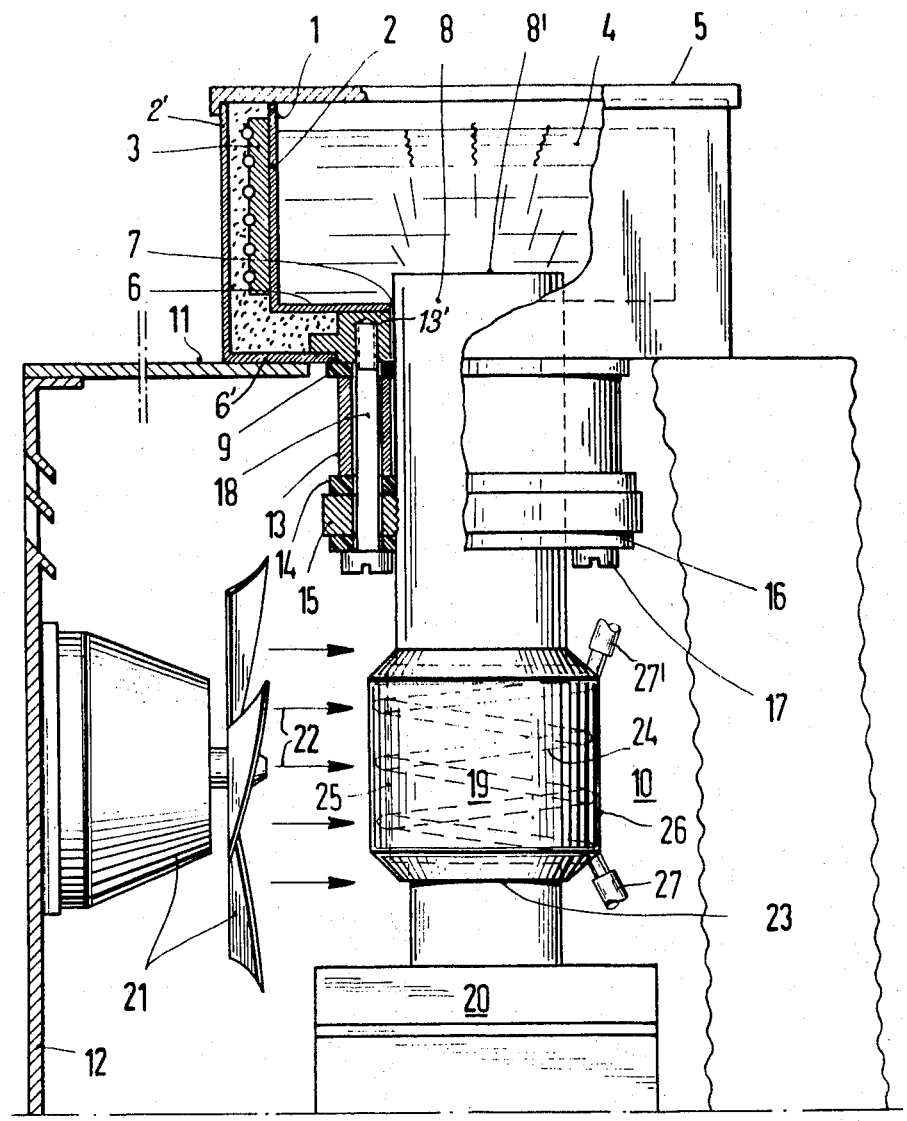

SOLDER BATH FOR FLUX-FREE TINNING

BACKGROUND OF THE INVENTION

1. Field of the Invention

The present invention is directed to a solder bath having an ultrasonic wave source to provide ultrasonic waves to permeate the soldering bath during a soldering or tinning process to enable flux-free tinning to occur.

2. Prior Art

In cleaning or coating of an object in a bath held in a container, it has been suggested to utilize a transducer to permeate the cleaning solution or molten material with ultrasonic waves to cause cavitation which provides a good cleaning action on the surface of the object being cleaned or coated. In the prior art it has been suggested that the best results would occur when the ultrasonic waves are reflected from the side walls of the container to reflect the energy contained therein and to aid in forming cavitation. It has been proposed to apply ultrasonic waves to a solder bath with the source for the ultrasonic waves having a probe or sonotrode which projects into the bath from one of the side walls. In such a bath, a tinning or coating of an object with a molten solder material occurs without the use of any fluxing agent. This is attributed to the cavitation occurring on the surface of the object being tinned which cavitation removes oxides and impurities that are formed thereon to enable the molten solder material to wet a metallically clean surface.

However, it has been noted that at certain points on the surface of an object being coated with molten material in such an apparatus an imperfect tinning or coating occurs resulting in undesirable imperfections. The cause of these imperfections is attributed to wave interference between ultrasonic waves from the sonotrode and reflected ultrasonic waves which cause cancellation of the wave energy in portions of the bath which prevent the cavitation at surfaces of an object in those portions to enable the formation or the adherence of oxide impurities thereon to cause an imperfection in the tinning or coating of the surface by the molten solder material.

Another difficulty encountered with devices for coating or tinning an object with molten solder using a bath having ultrasonic waves permeated therethrough is that the ultrasonic transducer may be heated to a temperature by the molten bath to cause changes in its output or even permanent damage to the transducer.

SUMMARY OF THE INVENTION

The present invention is directed to a device for coating or tinning an object with molten solder having a heated container for containing the molten solder material and a probe connected to an ultrasonic source projecting through a bottom wall of the container to permeate the solder bath with ultrasonic waves to enable coating of an object without the use of a fluxing agent. The position of the probe or sonotrode extending through an aperture in the bottom of the bath reduces the formation of reflecting waves which in turn reduces wave interference which causes cancellation of the ultrasonic waves in portions of the bath resulting in loss of cavitation in those portions. In the preferred embodiment, the probe of the ultrasonic source extends into the bath through an opening in the bottom wall with the seal between the probe and the bottom wall engaging the probe at a nodal plane for the ultrasonic waves. Preferably the probe is connected to the ultrasonic source by an intermediate member which is cooled either by blowing a stream of cooling air against its outer surface or by passing a cooling fluid through channels formed in the intermediate member to limit any heating of the transducer to prevent changes in its operation characteristic or damage thereto.

BRIEF DESCRIPTION OF THE DRAWING

The FIGURE is an elevational view with portions in cross-section for purposes of illustration of a device incorporating the principals of the present invention.

DESCRIPTION OF THE PREFERRED EMBODIMENT

The principals of the present invention are particularly useful when incorporated into a soldering device illustrated in the FIGURE which includes a container wall or side wall 2 which can be either of a circular configuration or rectangular configuration and is attached to a bottom wall 6 to define a chamber 4 for receiving a solder bath of molten solder material such as a tin solder or tin base solder.

To heat the material of the solder bath in the container 4, a heating element 3, such as an electrical heating unit, is mounted on the container wall 2. To prevent heat loss from the bath, the container 1 is preferably a double wall configuration with insulated material therebetween, which configuration has an outer container wall 2' and a bottom wall 6' which surrounds the walls forming the chamber 4. The container 1 terminates at an upper edge in an opening which is closed by a cover or lid 5 which may be provided with an aperture or slit.

The container 1 is disposed on an upper plate 11 of a case or housing 12 which defines a working chamber 10 which contains an ultrasonic transducer 20 connected to a probe or sonotrode 8 preferably by an intermediate member 19.

To introduce the ultrasonic waves into the solder bath contained in the chamber 4, the bottom wall 6 has an aperture or opening 7 through which the sonotrode or probe 8 is inserted and projects into the bath with a radiating surface 8' spaced above the bottom wall 6. The probe or sonotrode 8 acts as a conductor for transmitting the ultrasonic waves generated by the transducer 20 to the bath in the chamber 4.

To prevent the escape of the solder bath material from the chamber 4 into the chamber 10, a sealing means is provided at the aperture 7. The sealing means includes annular sealing rings 9, 14 and 16, a spacer ring 13, an annular ring 13', and an annular plate ring 15 all assembled together by a plurality of bolts or threaded members 17. The annular ring 13' is attached to the bottom of the bottom wall 6 and to the outer bottom wall 6' of the container 1 and has a plurality of threaded bores for receiving the threaded fastener 17. The sealing rings 9, 14 and 16, the spacer ring 13 and the annular plate-like ring 15 all have apertures for the threaded fasteners 17 which are used to hold them in a clamped assembly on the ring 13' with the spacer 13 separating the sealing ring 9 from the sealing ring 14 and holding the sealing ring 9 against the annular ring 13'. The plate-like member 15 engages the outer surface of the sonotrode 8 and is disposed between the sealing rings 14 and 16. When the fasteners 17 are tightly threaded into the bores of the rings 13', the sealing rings are compressed so that the sealing ring 9 engages the outer surface of the probe 8 to form a first seal to prevent the flow of the solder bath into the working chamber 10 of the housing 12. A second seal is formed by compression of the sealing ring 14 to prevent flow of the solder material from the bath if the first sealing ring 9 becomes damaged or broken. The engagement of the sealing rings such as 9 and the plate member 15 are preferably at a nodal plane of the probe 8 which is a point of minimal vibration in the probe 8 for the particular ultrasonic wave being transmitted thereby.

As mentioned hereinabove, the heat of the solder bath contained in the chamber 4 will be conducted by the probe 8 to the transducer 20 and may heat the transducer to a temperature which would be detrimental to its operation. Thus, cooling means are provided to prevent over-heating of the transducer 20 and, as illustrated, are preferably interposed between the transducer 20 and the sonotrode 8 at the intermediate member 19. As illustrated, the cooling can be accomplished by a fan 21 which directs an air flow indicated by arrows 22 against the surface of the intermediate member 19 to provide cooling therefor and to prevent the temperature at an interface 23 between the transducer 20 and the intermediate member 19 from exceeding a value of approximately 30° C.

Another means for cooling the intermediate member is to provide cooling channels 24 surrounding the outer surface 25 as shown in dotted lines and covered by an outer shell 26 provided on the intermediate member 19. The channels 24 have couplings 27 and 27' for connecting the channels 24 to a source of circulating cooling fluids such as the output of a pump and its sump.

With the arrangement described hereinabove, the drawbacks of local sound cancellation of the ultrasonic waves in the bath resulting in imperfections in the coating or tinning with a solder material are greatly reduced or eliminated. Furthermore, the above-described cooling maintains the transducer 20 in a temperature range which guarantees and insures the bath being permeated with ultrasonic waves which are continuous and of equal strength.

Cooling of an ultrasonic source is common with magnorestrictive type oscillators, however cooling is not common with electrostrictive oscillators such as the transducer 20 which may be either a coil type oscillator or a piezo ceramic type oscillator. Thus the cooling of the intermediate member insures that transducer 20 does not reach a temperature which exceeds 30° C and prevents variations in the strength of the sound waves emitted by the transducer and any permanent damage thereto which could occur if the transducer 20 were heated to a temperature above 30° C.

The sealing means for sealing the probe or sonotrode 8 in the aperture 7 of the bottom wall 6 enables a replacement of the sonotrode and the changing of its length. It is noted that the sealing rings engage the surface of the sonotrodes at nodal planes for the sound and the distance between the rings 9 and 14 can be varied by changing the size of the spacer member 13 if different wave lengths are utilized. Thus, the device of the present invention can be adjusted to ultrasonic waves of different wave lengths by changing the distance between the sealing rings 9 and 14. Furthermore, if a sonotrode or probe 8 becomes damaged or needs replacing, such replacement can be easily accomplished.

In utilizing the device during a coating or tinning operation, an object to be tinned without being previously wetted with a fluxing agent can be dipped into the molten solder bath above the probe 8. The ultrasonic waves emitted by the probe 8 will create cavitation on the surfaces being coated to remove impurities and oxides to enable the coating with the solder material. The time necessary for the coating operation can be adjusted by using a timer or by using a time switching device.

The solder bath of molten solder material provided in the device of the present invention enables perfect tinning of materials such as brass, nickel, copper, beryllium bronze with solder materials such as tin or a tin mixture. It has also been found that materials such as aluminum which are usually considered difficult to be tinned or coated are easily coated without imperfections therein when tinned by dipping into the molten solder bath of the device of the present invention.

Although minor modifications might be suggested by those versed in the art, it should be understood that we wish to embody within the scope of the patent warranted hereon all such modifications as reasonably and properly come within the scope of our contribution to the art.

We claim as our invention:

1. A device for applying a coating of molten solder on an object without the use of a flux by dipping the object into a molten solder bath which is subjected during a coating operation to ultra-sonic waves, the device comprising:
a container for a bath of molten solder, said container being formed by a bottom wall and at least one side wall attached thereto;
heating means disposed on said container for heating the bath of molten solder;
means for creating an ultra-sonic waves disposed beneath the container including a probe, an intermediate member, an ultra-sonic transducer, said probe being connected to the transducer by the intermediate member and extending therefrom with an end of the probe extending through said bottom wall for conducting the ultra-sonic waves from said transducer into the bath of molten solder so that the ultra-sonic waves from the probe penetrate the bath of molten solder with a minimum of reflection from the walls of the container to reduce the areas in the bath of molten solder in which the ultrasonic waves are cancelled out by interference;
means for sealing the probe in the bottom wall including at least one sealing ring surrounding the probe at a nodel sound plane of the probe and means clamping said ring into light engagement with said probe and sealing engagement with the bottom wall of the container; and
means for directly cooling said intermediate member to prevent over-heating of the transducer by the conduction of heat from the molten bath along the probe.

2. A device according to claim 1, wherein said means for cooling comprises a fan arranged beneath said container for projecting an air stream at said intermediate member.

3. A device according to claim 1, wherein said means for cooling comprises cooling channels provided adjacent an outer surface of the intermediate member and means for providing a stream of cooling fluid through said channels.

4. A device according to claim 1, wherein said means for cooling is a fan for directing a stream of air at said intermediate member.

5. A device for applying a coating of molten solder on an object without the use of flux by dripping the object into a molten solder bath which is subjected during a coating operation to ultra-sonic waves, the device comprising:

a container for a bath of molten solder, said container being formed by a bottom wall and at least one side wall attached thereto;

heating means disposed on said container for heating the bath of molten solder;

means for creating an ultra-sonic waves disposed beneath the container including a probe, an intermediate member, and an ultra-sonic transducer, said probe being connected to the transducer by the intermediate member and extending therefrom with an end of the probe extending through said bottom wall for conducting the ultra-sonic waves from said transducer into the bath of molten solder so that the ultra-sonic waves from the probe penetrate the bath of molten solder with a minimum of reflection from the walls of the container to reduce the areas in the bath of molten solder in which the ultra-sonic waves are cancelled out by interference; and means for directly cooling said intermediate member to prevent over-heating of the transducer by the conduction of heat from the molten bath along the probe, said means for cooling including a cooling channel in said intermediate member and means for passing a cooling fluid therethrough.

* * * * *